UNITED STATES PATENT OFFICE.

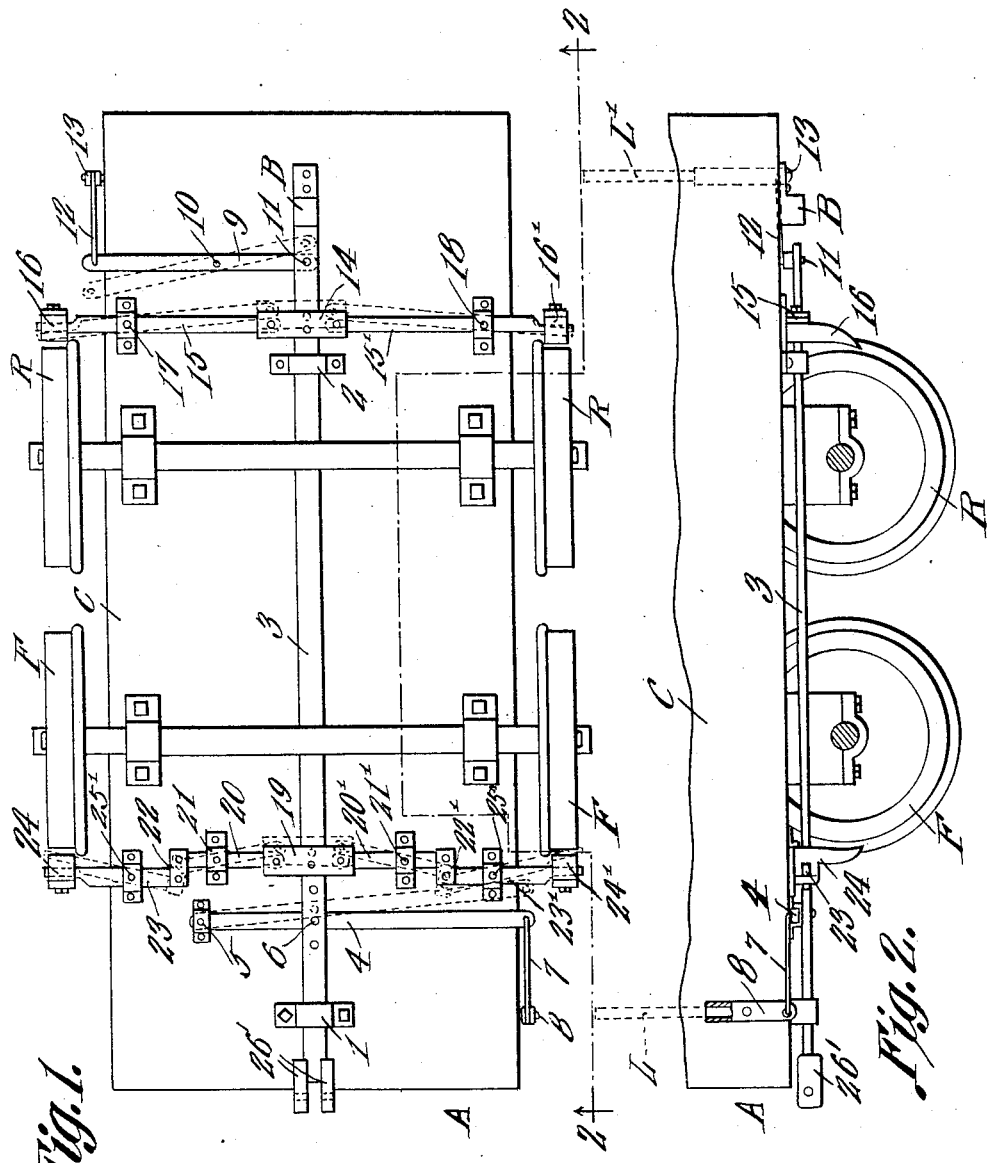

JOHN O. MARTIN AND HENRY W. SCHEILER, OF LINCOLN, ILLINOIS, ASSIGNORS OF ONE-THIRD TO JOSEPH MALERICH, OF LINCOLN, ILLINOIS.

BRAKE MECHANISM.

1,039,771.   Specification of Letters Patent.   Patented Oct. 1, 1912.

Application filed December 18, 1911. Serial No. 666,436.

*To all whom it may concern:*

Be it known that we, JOHN O. MARTIN and HENRY W. SCHEILER, citizens of the United States, residing at Lincoln, in the county of Logan, State of Illinois, have invented a new and useful Brake Mechanism, of which the following is a specification.

The present invention relates to improvements in brake mechanisms, the primary object of the invention being the provision of a car brake mechanism, to which a longitudinally disposed and centrally arranged bar is mounted to have a longitudinal sliding movement below the body of the car and to control a plurality of links and levers so disposed and carrying brake shoes, that the movement of the longitudinal bar in one direction will cause the simultaneous application of all of the brake shoes toward each other and into wheel tread engaging or braking position.

A further object of the invention is the provision of a braking mechanism so mounted and disposed as to simultaneously actuate two oppositely disposed sets of brake shoe operating levers, a hand operated mechanism being disposed at accessible points along the car and provided with lever receptacles or sockets, whereby the brakeman carrying a removable handle may insert the same within the socket and actuate the brake, the said brake mechanism being so constructed, however, whereby the same may be if desired connected to a pneumatically controlled or air brake system so that the braking shoes may be actuated upon the full train.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is bottom plan view of a single truck car with the improved brake mechanism applied thereto, dotted lines illustrating the position of the various parts when the brake shoes are in set position. Fig. 2 is a section taken on line 2—2 of Fig. 1. Fig. 3 is a perspective view of one of socketed levers for receiving the removable brake mechanism actuating handle.

Referring to the drawings, A designates the car body which is mounted upon the front wheels F and the rear wheels R, while connected to the under side of the body of the car are the two longitudinally alined guiding straps 1 and 2 respectively, to which is mounted for longitudinal sliding movement the main brake actuating rod or bar 3, the same being limited in its rearward movement, so that the jar imparted to the car during the coupling thereof will not injure the same, by a buffer B which is secured to the under side of the car body as clearly shown in Figs. 1 and 2. In order to impart to the said bar 3 the desired longitudinal movement to actuate the braking mechanism hereinafter to be described, a lever 4 is fulcrumed at 5 to the bottom of the car and is pivotally connected at 6 to the bar 3 while the outer free end of said lever 4 projects beyond the body of the car and is connected through the medium of the link 7 to the lower end of the socketed lever 8, which is provided with the socket 26 in the upper end thereof for the reception of the removable handle L, which may be carried by the brakeman, and thus permit the lengthening of the lever to actuate the braking mechanism and at the same time prevent an undesirable abutment beyond and above the car body. This mechanism permits the actuation of the brake from the forward end of the car as viewed in Figs. 1 and 2, and to permit the actuation thereof at the rear end of the car and upon the opposite side thereof, a lever 9 is fulcrumed intermediate of its ends at 10 to the under side of the car and its inner free end pivoted at 11 to the end of the longitudinally slidable bar 3, the link 12 being connected to the outer end of the lever 9 and to the lower end of the socketed lever 13 which is similar to the socketed lever 8 and is adapted to have removably fitted therein the actuating handle or lever L'.

In order to permit the longitudinal sliding action of the bar 3 to actuate the braking mechanism for the various wheels of the truck, a cross head 14 is connected to the bar 3 at the rear of the guiding strap 2 as clearly shown in Fig. 1, and pivotally connected to the respective oppositely disposed ends thereof are the brake shoe actuating levers 15 and 15' respectively, which levers are pivoted in their respective guiding straps 17 and 18 and carry upon their outer ends the respective brake shoes 16 and 16', the same being disposed to be moved toward and be thrown into engagement with the treads of the respective rear wheels R. By this construction it will be seen that the movement of either one of the levers 4 or 9 to the dotted line position in Fig. 1, will cause the movement of the inner ends of the levers 15 and 15' toward the buffer B, thus throwing the outer free ends of the brake shoes 16 and 16' toward and into engagement with the rear wheels R.

In order that a simultaneous braking action will be produced upon the front wheels F, a cross head 19 is connected to and carried by the bar 3 between its pivotal point with the lever 4 and the front axle of the wheels F, the inner ends of the respective short levers 20 and 20' being pivotally connected to said cross head 19, the said levers 20 and 20' are pivotally connected in their respective straps 21 and 21' carried by the under portion or body of the car. The links 22 and 22' connect the respective outer ends of the short levers 20 and 20' to the inner ends of the oppositely disposed and actuated short levers 23 and 23', which as shown carry at their outer ends the respective front wheel engaging brake shoes 24 and 24', said levers 23 and 23' being pivoted intermediate of their ends to the respective straps or pivoting means 25 and 25', whereby the movement of the bar 3 to the dotted line position as clearly shown in Fig. 1 will actuate the respective levers 20 and 20', and 23 and 23' to assume the dotted line position and cause the brake shoes 24 and 24' to be thrown into braking engagement with the treads of the front wheels F simultaneously with the throwing in of the brake shoes 16 and 16' into the treads of the rear wheels R. By this construction it will be seen that either one of the levers 8 or 13 may be actuated manually to produce the desired longitudinal sliding movement to the bar 3 and thus simultaneously move both of the cross heads 14 and 19 to set the respective brake shoes. By means of the coupling 26' connected to the end of the longitudinal sliding bar 3, the brake cylinder (not shown) may be connected thereto so that the brake may be operated pneumatically.

From the foregoing description taken in connection with the drawings, it is evident that a braking mechanism constructed according to the present invention, is exceedingly simple in construction and when applied to the present form of car truck, produces a better braking action by reason of the fact that it grips the wheels not upon the adjacent inner faces but upon the opposite outer faces thereof, the arrangement of the respective levers actuated by the sliding bar permitting a greater leverage or power to be exerted with the least movement of the manually actuated mechanism, due to the long length of the levers such as 4 and 9 for controlling the movement of the longitudinal bar 3. It is also evident that in order to return the mechanism to the full line position in Fig. 1 that springs or other return mechanism may be employed.

What is claimed is:

1. The combination with a truck having two pairs of wheels, of a brake mechanism, comprising a longitudinally disposed and slidable bar, two levers operably connected to the respective ends of said bar and having their free ends disposed in opposite directions, manually controlled means operably connected to the outer ends of said levers, whereby the bar may be actuated by either lever, two cross heads carried by said longitudinally disposed bar one to each pair of wheels, a single lever connected to each of the respective ends of one of said cross heads having its outer end in wheel tread engaging position, a brake shoe carried thereby, two connected levers connected to each of the respective ends of the other cross head of the longitudinal bar, the outer lever having its outer end in wheel tread engaging position, and a brake shoe mounted in the outer end thereof for engagement with one of the other pair of wheels.

2. The combination with a car body and a truck having two pairs of wheels, of a brake mechanism, comprising a bar longitudinally disposed and slidably mounted upon the under side of the car body, a lever actuated mechanism connected to the respective ends of said bar for imparting longitudinal movement thereto, two cross heads carried by said bar one to each pair of wheels of the truck, and a brake shoe carrying means operably connected to the under side of the car and to the respective terminals of the cross heads, whereby the movement of the longitudinal bar brake shoe carrying mechanisms are actuated to engage the treads of the respective wheels.

3. The combination with a car body and a truck having two pairs of wheels, of a brake mechanism, comprising a bar longitudinally disposed and slidably mounted upon the under side of the car body, a lever actuated mechanism connected to the respective ends of said bar for imparting longitudinal movement thereto, two cross heads carried by said bar, one to each pair of wheels of the truck, a pair of long levers having their inner ends pivotally connected to the respective terminals of one of the cross heads, means for pivotally connecting the said levers to the car body intermediate their ends with their outer free ends disposed beyond the car body and in braking relation to the treads of one pair of said wheels, a brake shoe carried by each outer end thereof, two pairs of levers operably connected together and pivoted to the under side of the car body, the inner ends of each pair being operably connected to the respective terminals of the other cross head of the longitudinal bar, the outer ends of the outer levers being disposed beyond the body of the car and into wheel braking relation to the other pair of wheels, and brake shoes carried in said outer ends whereby the movement of the longitudinal bar will cause the brake shoes of all of said levers to be moved toward each other and into braking engagement with their respective wheels.

In testimony that we claim the foregoing as our own, we have hereto affixed our signatures in the presence of two witnesses.

JOHN O. MARTIN.
HENRY W. SCHEILER.

Witnesses:
HERMAN HEINZEL,
DAVID W. CLARK.

Copies of this patent may be obtained for five cents each, by addressing the "Commissioner of Patents, Washington, D. C."